(12) United States Patent
Ougier et al.

(10) Patent No.: US 11,260,648 B2
(45) Date of Patent: Mar. 1, 2022

(54) MATERIAL CONVEYING SCREW AND METHOD FOR PRODUCING SAME

(71) Applicant: COMPAGNIE GENERALE DES ETABLISSEMENTS MICHELIN, Clermont-Ferrand (FR)

(72) Inventors: Christophe Ougier, Clermont-Ferrand (FR); Arnaud Letocart, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 207 days.

(21) Appl. No.: 16/062,802

(22) PCT Filed: Dec. 16, 2016

(86) PCT No.: PCT/EP2016/081372
§ 371 (c)(1),
(2) Date: Jun. 15, 2018

(87) PCT Pub. No.: WO2017/103061
PCT Pub. Date: Jun. 22, 2017

(65) Prior Publication Data
US 2020/0282622 A1 Sep. 10, 2020

(30) Foreign Application Priority Data
Dec. 18, 2015 (FR) .................................. 1562811

(51) Int. Cl.
*B33Y 10/00* (2015.01)
*B29C 48/515* (2019.01)
(Continued)

(52) U.S. Cl.
CPC ............ *B33Y 10/00* (2014.12); *B29C 48/395* (2019.02); *B29C 48/507* (2019.02);
(Continued)

(58) Field of Classification Search
CPC ................................ B29C 48/85; B29C 45/60
See application file for complete search history.

(56) References Cited

U.S. PATENT DOCUMENTS 3,999,921 A      12/1976 Thor et al.
5,547,277 A  *   8/1996 Caspelherr .............. B29C 48/84
                                                              366/146
(Continued)

FOREIGN PATENT DOCUMENTS

DE       1751961 A1      6/1971
DE       4343390 A1 *    6/1995     ............. B29C 48/85
(Continued)

OTHER PUBLICATIONS

Translation of DE 43 43 390 (Year: 1995).*
Mar. 27, 2017 International Search Report and Written Opinion in International Patent Appln. No. PCT/EP2016/081372.

*Primary Examiner* — Marc C Howell
*Assistant Examiner* — John J DeRusso
(74) *Attorney, Agent, or Firm* — Venable LLP (57) ABSTRACT

A screw having a longitudinal body and, around this longitudinal body, at least one flight extending in the shape of a helix, the flight including, over part of its length, internal partitioning delimiting a plurality of internal channels that extend in the shape of helices following the helix shape of the flight. The screw includes manifold-like cavities into which the ends of the interior canals open, the manifold-like cavities extending radially and opened into a longitudinal bore of the body at longitudinally spaced locations. This screw can be produced by additive manufacturing using laser-induced fusion.

10 Claims, 5 Drawing Sheets

(51) Int. Cl.

| | | |
|---|---|---|
| | *B29C 48/84* | (2019.01) |
| | *B29C 48/85* | (2019.01) |
| | *B29C 48/505* | (2019.01) |
| | *B29C 48/395* | (2019.01) |
| | *B33Y 80/00* | (2015.01) |
| | *B29C 48/92* | (2019.01) |
| | *B22F 10/20* | (2021.01) |

(52) U.S. Cl.
CPC .......... *B29C 48/515* (2019.02); *B29C 48/845* (2019.02); *B29C 48/85* (2019.02); *B29C 48/92* (2019.02); *B33Y 80/00* (2014.12); *B22F 10/20* (2021.01); *B29C 2948/92704* (2019.02); *B29C 2948/92885* (2019.02)

(56) References Cited

U.S. PATENT DOCUMENTS

| | | |
|---|---|---|
| 5,843,489 A | 12/1998 | Nakano |
| 2014/0027095 A1 | 1/2014 | Warchol et al. |
| 2015/0352770 A1 | 12/2015 | Busenbecker |
| 2018/0370074 A1 | 12/2018 | Ougier et al. |

FOREIGN PATENT DOCUMENTS

| | | |
|---|---|---|
| DE | 100 13 474 A1 | 9/2001 |
| DE | 10 2011 014 474 A1 | 9/2012 |
| EP | 0 808 705 A1 | 11/1997 |
| EP | 2 952 275 A1 | 12/2015 |
| EP | 2 688 725 B1 | 2/2016 |
| JP | S53-016076 A | 2/1978 |
| JP | H04-052026 U | 5/1992 |
| NL | 7503491 A | 10/1975 |
| WO | 2012/126574 A1 | 9/2012 |

\* cited by examiner

MATERIAL CONVEYING SCREW AND METHOD FOR PRODUCING SAME

BACKGROUND

The present invention relates to the field of screws for conveying materials, which screws are used notably in extrusion or injection machines and generally mounted inside barrels.

Particularly when the materials to be conveyed are elastomer-based vulcanizing compounds, there is a need to regulate the temperature of the screws in order to avoid an increase in temperature of the compounds as a result in particular of the effects of shearing of the compounds as the screws rotate, and premature vulcanization of the compounds.

European patent EP 2 688 725 describes a screw the helical flight of which exhibits a helical groove that follows its profile and is open towards the outside. An elongate cover strip, wound into a helix, is welded to the edges of this groove, to form an interior canal. The ends of this interior canal are connected to longitudinal canals of the screw shaft, so that a liquid coolant can be circulated in this interior canal.

Such a screw is in fact unsuitable for inclusion in a machine that extrudes or injects elastomer-based vulcanizing compounds that must not be vulcanized while they are being transported, for example in the manufacture of tyres. In addition, there is a risk that the temperature-regulating or cooling liquid will become mixed with the material if the welds of the cover strip fail. Furthermore, the manufacture of such a screw entails several delicate operations, thereby increasing the cost and the risk of failure.

In general, the screws for extruding rubber are highly loaded at the crests of the flights, as a result of their being fed with cold strip, and this creates radial loadings between the screw and the barrel. These flights are, incidentally, often filled with wear-resistant materials (carbides in a matrix of nickel or cobalt). In applications of the twin-screw type, it is the forces of shearing between the screws that generate a parting force that presses the crests of the screw flights against the barrel.

SUMMARY

It is an objective of the present invention to improve the structure of the screws, notably screws for conveying material, the usage and methods of manufacture thereof.

According to one embodiment there is proposed a one-piece screw that includes a longitudinal body and, around this longitudinal body, at least one flight extending in the form of a helix.

The flight includes, over part of its length, an interior partitioning delimiting a plurality of interior canals that extend in the form of helices following the helix shape of the flight.

The screw includes manifold-like cavities into which the ends of the interior canals open.

The manifold-like cavities extend radially and open into a longitudinal bore of the body at longitudinally spaced locations.

The flight may include an exterior wall defining its exterior surface, the interior partitioning having at least one interior partition extending from this exterior wall.

The interior partitioning may include at least one partition extending from the longitudinal body.

The interior partitioning may include a core and a plurality of interior partitions radiating from this core, so as to delimit interior canals situated around this core.

The interior partitioning may include interior partitions having equal thicknesses.

The exterior wall and the interior partition may have equal thicknesses.

The body may be provided with a longitudinal bore in which splines are created.

The body may include a load transmission shaft.

Also proposed is a method for manufacturing a screw, in which method this screw is created by additive manufacturing by deposition and agglomeration of successive layers of powder that are perpendicular to the axis of such a screw that is to be manufactured.

Also proposed is a method for manufacturing a screw, in which method this screw is created by additive manufacturing by deposition and agglomeration of successive layers of powder that are parallel to the axis of such a screw that is to be manufactured.

Also proposed is an assembly that includes the one-piece screw as defined previously and that includes further a mounting and transmitting shaft engaged into the bore of the screw and secured to the last and provided with a longitudinal bore.

The wall of the mounting and transmitting shaft can have radial orifices communicating with the said cavities of the screw.

BRIEF DESCRIPTION OF THE DRAWINGS

Screws and assemblies including screws will now be described by way of nonlimiting examples, illustrated by the attached drawing in which.

DETAILED DESCRIPTION

Figure 1:
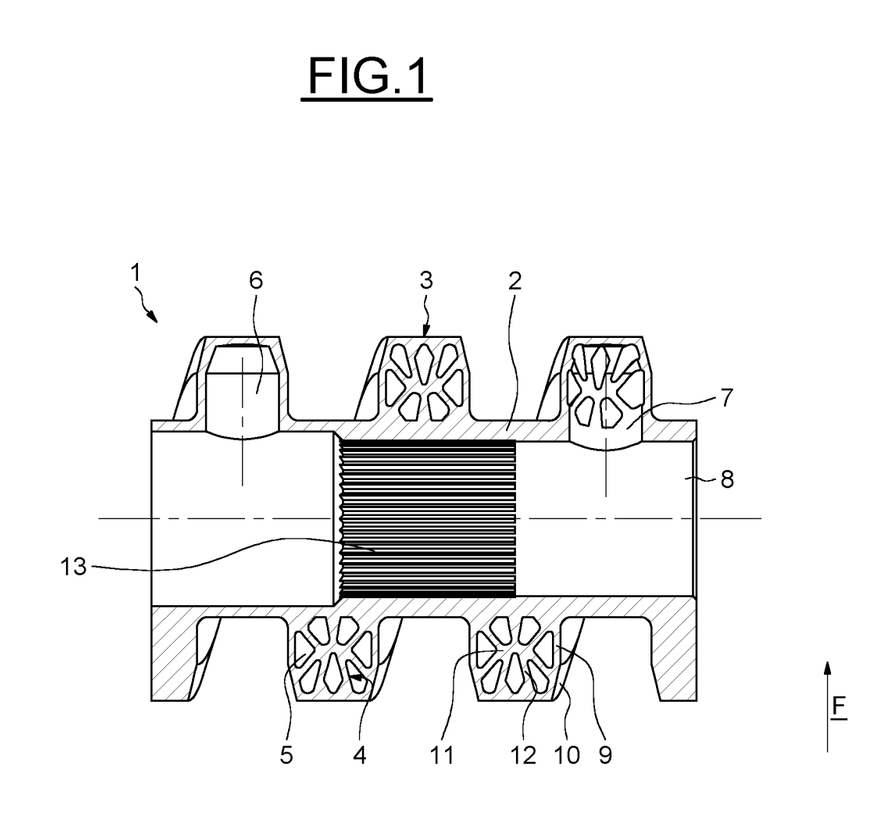
FIG. 1 depicts a longitudinal section through a screw.

As illustrated in FIG. 1, a one-piece screw 1 includes a longitudinal cylindrical body 2 and an external flight 3 formed in a helix around the cylindrical body 2.

According to the example depicted, this external flight 3 has a transverse profile that is substantially trapezoidal, rectangular, trapezoidal, or that has a more complex shape such as an involute to a circle, in the manner of gears.

The external flight 3 includes internal partitioning 4 that delimits a plurality of interior canals 5 that extend, over part of the length of the flight 3, in the form of helices that follow the helix-shaped profile of the flight 3.

The flight 3 is provided, at short distances away from its ends, with radial interior manifold-like cavities 6 and 7 into which the corresponding ends of the interior canals 5 open, and that are aligned longitudinally. These manifold-like cavities 6 and 7 extend inwards through the wall of the cylindrical body 2 and open into the longitudinal bore 8 of this body 2, at longitudinally-spaced points.

The flight 3 includes an exterior wall 9 that defines its exterior surface 10.

The interior partitioning 4 includes an interior core 11 and interior partitions 12 that extend in the manner of spokes from this core 11 and some of which meet the exterior wall 9 while the others meet the cylindrical body 2. Thus, the interior canals 5 are substantially distributed around the core 11.

The joins at which the interior partitions 12 meet the exterior wall 9 and the cylindrical body 2 are fillet-radiused, and the roundness of these fillets, when viewed from the inside of the canals 5, is concave.

Advantageously, the exterior wall 9 and the partitions 12 may, between their aforementioned joins, have substantially equal thicknesses. Furthermore, the combined cross section of the interior canals 5 is at least equal to fifty percent (50%) of the total cross section of the flight 3.

The longitudinal bore 8 of the cylindrical body 2 is provided with means allowing circumferential conveying, such as splines 13 that extend between and some distance away from the manifold-like cavities 6 and 7.

Figure 2:
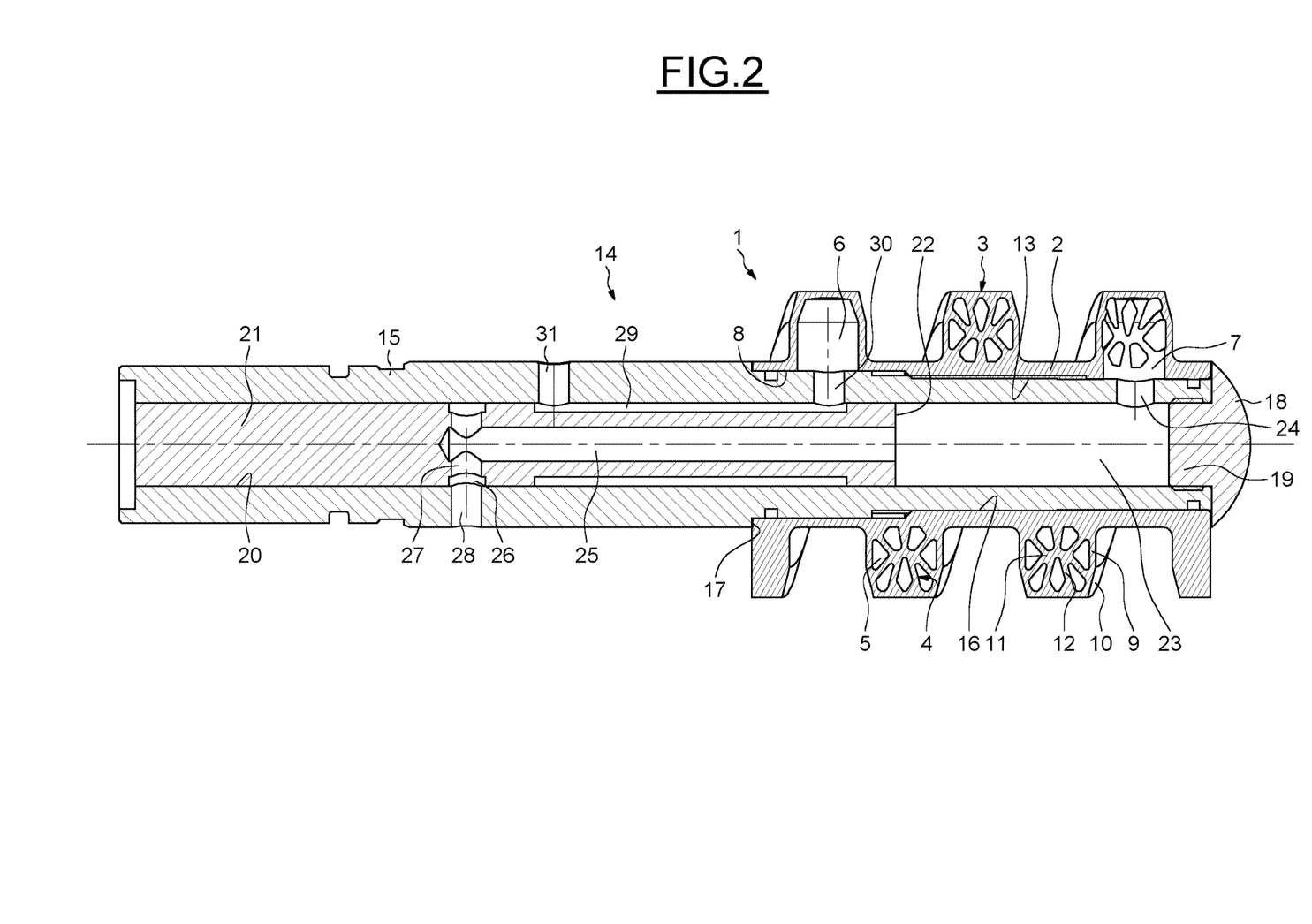
FIG. 2 depicts an assembly including the screw of FIG. 1.

FIG. 2 illustrates an assembly 14 that includes the screw 1.

This assembly 14 includes a cylindrical longitudinal shaft 15 for mounting and for the transmission of load, that is engaged in the longitudinal bore 8 of the screw 1 and that has the exterior splines 16 engaged with the interior splines 13 of the screw 1. The cylindrical body 2 of the screw 1 is, longitudinally, held between a shoulder 17 of the shaft 15 and the head 18 of a mounting screw 19 screwed longitudinally onto an end of the shaft 15.

The longitudinal mounting shaft 15 has a cylindrical longitudinal bore 20 in which a longitudinal distribution shaft 21 is installed, securely and in a sealed manner.

The distribution shaft 21 has an end 22 positioned between the manifold-tike cavities 6 and 7 of the screw so as to create, beyond this end 22, an internal space 23 in the longitudinal bore 20 of the mounting shaft 15. This space 23 communicates with the manifold-like cavity 7 of the screw 1 via a radial orifice 24 created through the wall of the mounting shaft 15.

The distribution shaft 21 is provided with a local longitudinal canal 25 that opens into the internal space 23 via its radial end face 22 and with a peripheral groove 26 that communicates with the longitudinal canal 25 via a radial orifice 27. The wall of the mounting shaft 15 is provided with an external-communication radial through-orifice 28 that opens into the groove 26 and that is situated at a point distant from the screw 1.

The distribution shaft 21 is provided with a peripheral groove 29 that communicates with the manifold-like cavity 6 of the screw 1 via a radial orifice 30 created through the wall of the mounting shaft 15. The wall of the mounting shaft 15 is provided with an external-communication radial through-orifice 31 that opens into the groove 29 and that is situated at a point distant from the screw 1.

The above assembly means that by connecting the external-communication radial orifice 28 to a source of a fluid, for example a liquid, and by connecting the external-communication radial orifice 31 to a discharge, or vice versa, this fluid can be made to circulate through the interior canals 5 of the flight 3 of the screw 1, between the manifold-like cavities 6 and 7. Thus, the fluid that circulates in parallel along the interior canals 5 may constitute a means of regulating the temperature of the screw 1, and more specifically of the flight 3.

The assembly 14 may form a means of conveying or moving a material, for example one that is liquid or in the form of powder or granules, through a barrel of a machine, not depicted, for example an extrusion or injection machine, the mounting shaft 15 being connected to a rotational-drive motor and the screw 1 constituting a means for moving a material along a chamber of the barrel, this barrel being provided with means of connection of the external-communication radial orifices 28 and 31. For example, this material may be an elastomer-based vulcanizing compound for the manufacture of tyres.

It is a consequence of the foregoing that the partitioning 4 not only delimits the parallel interior canals 5, which may be distributed over the entire cross section of the flight 3, but also constitutes a structure for supporting and reinforcing the exterior wall 9 of the flight 3, such that the flight 3, and more particularly the exterior wall 9 thereof, is able to withstand high loads, while at the same time providing regulation of the temperature of the screw under the effect of the fluid circulating along the interior canals 5, with respect to the temperature of the material being moved.

Figure 3:
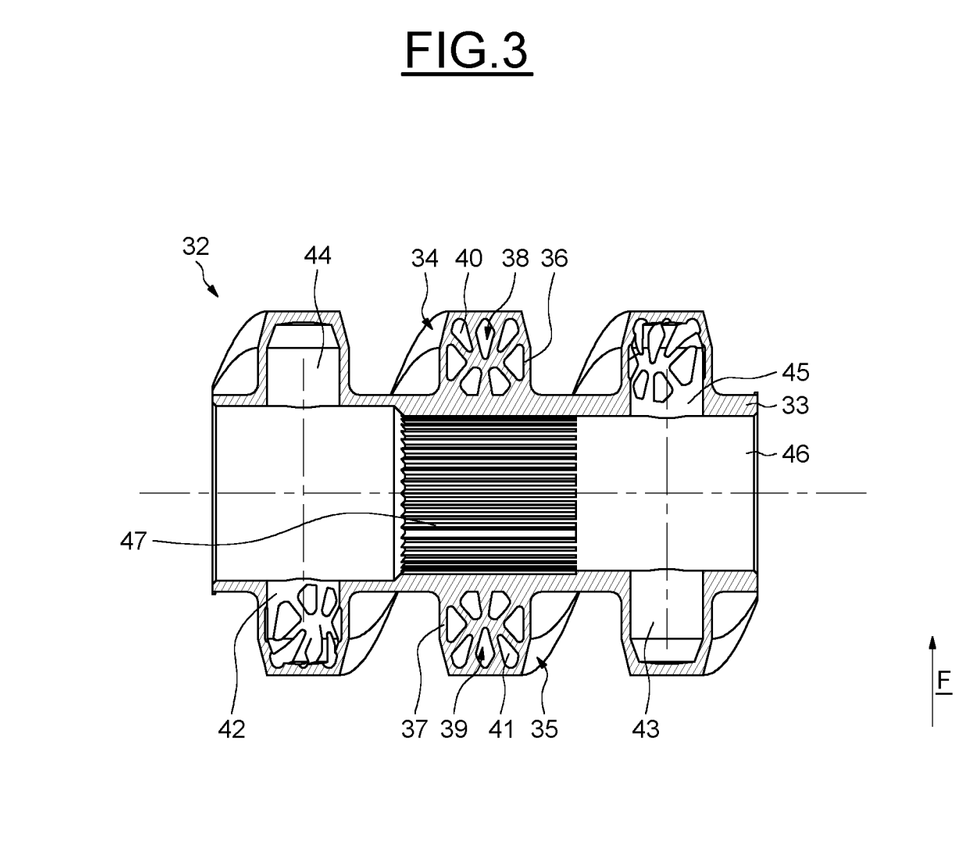
FIG. 3 depicts a longitudinal section through another screw.

FIG. 3 illustrates a one-piece screw 32 that includes a longitudinal cylindrical body 33 and two parallel external screw flights 34 and 35 in a helix around the cylindrical body 33.

These parallel exterior screw flights 34 and 35 are respectively constructed in an equivalent way to the flight 3 of the screw 1 described with reference to FIG. 1.

These screw flights 34 and 35 respectively include exterior walls 36 and 37, interior partitionings 38 and 39 that delimit pluralities of helical interior canals 40 and 41, manifold-like radial cavities 42 and 43 into which the ends of the interior canals 40 of the flight 34 open and manifold-like radial cavities 44 and 45 into which the ends of the interior canals 41 of the flight 35 open. The manifold-like cavities 42 and 44 and the manifold-like cavities 43 and 45 are, respectively, diametrically opposed. The manifold-like cavities 42 and 43 and the manifold-like cavities 44 and 45 are, respectively, longitudinally aligned.

The longitudinal bore 46 of the cylindrical body 33 is provided with interior splines 47.

Figure 4:
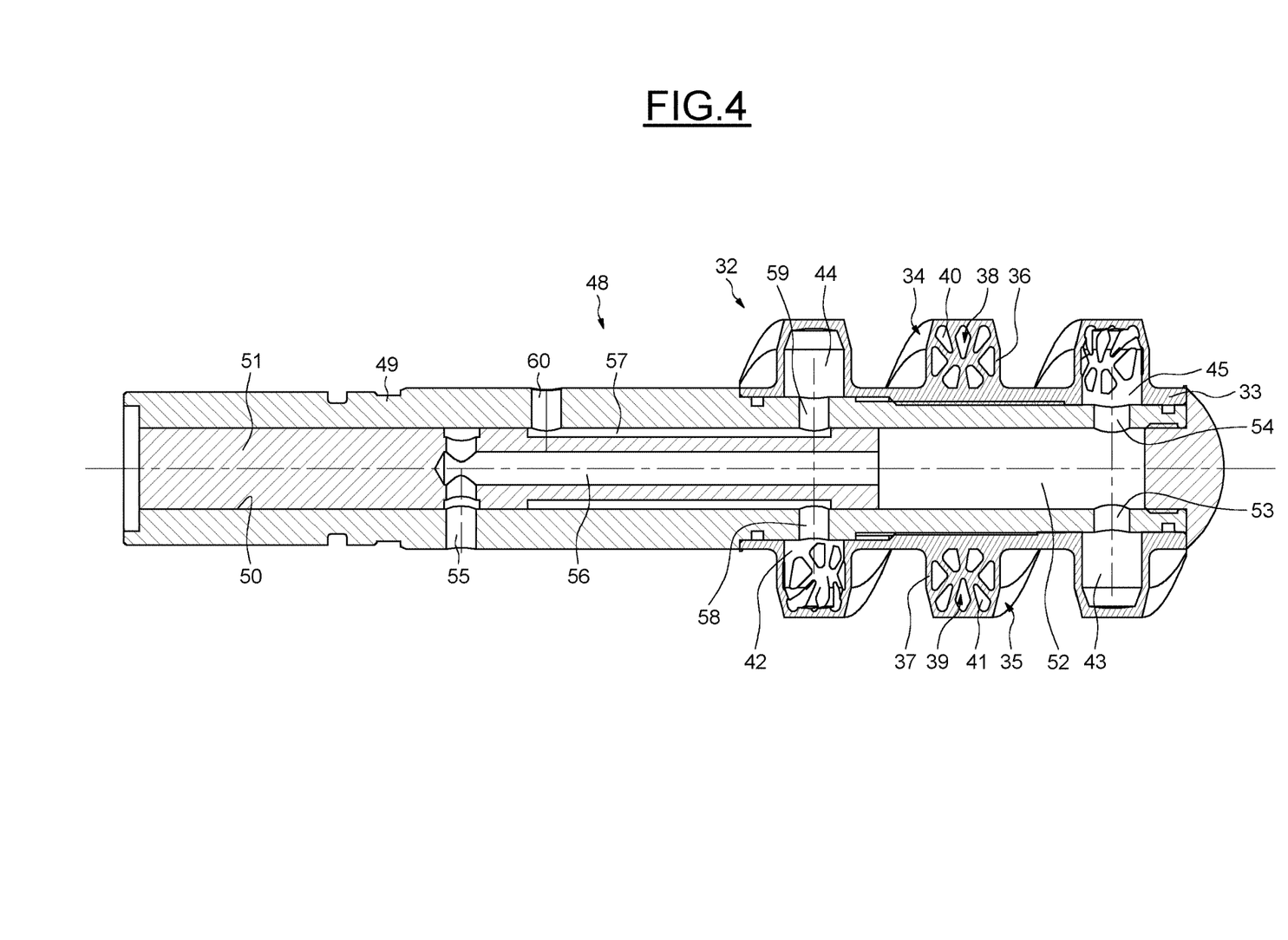
FIG. 4 depicts an assembly including the screw of FIG. 3.

FIG. 4 illustrates an assembly 48 that includes the screw 32, equivalent to the assembly 14 described with reference to FIG. 2 and allowing a temperature regulating fluid to circulate in parallel along the interior canals 40 and 41 of the screw flights 34 and 35.

This assembly 48 includes a longitudinal mounting shaft 49 on which the screw 32 is mounted and a longitudinal distribution shaft 51 mounted in the longitudinal bore 50 of the mounting shaft 49, the shafts being arranged like the shafts 15 and 21 for such parallel circulation.

The manifold-like cavities 43 and 45 of the screw flights 34 and 35 communicate with an internal space 52 of the mounting shaft 49, via through-orifices 53 and 54 of the mounting shaft 49. The internal space 52 communicates with an external-communication radial orifice 55 of the mounting shaft 49 via a longitudinal local canal 56 of the distribution shaft 51.

The manifold-like cavities 42 and 44 of the screw flights 34 and 35 communicate with a peripheral groove 57 of the distribution shaft via through-orifices 58 and 59 of the mounting shaft 49. The mounting shaft 49 is provided with an external-communication through-orifice 60 that opens into the peripheral groove 57.

As described previously, by connecting the external-communication orifices 55 and 60 respectively to a fluid source and to a discharge, this fluid can be made to circulate in parallel respectively along the interior canals 40 and 41 of the parallel screw flights 34 and 35 of the screw 32.

Figure 5:
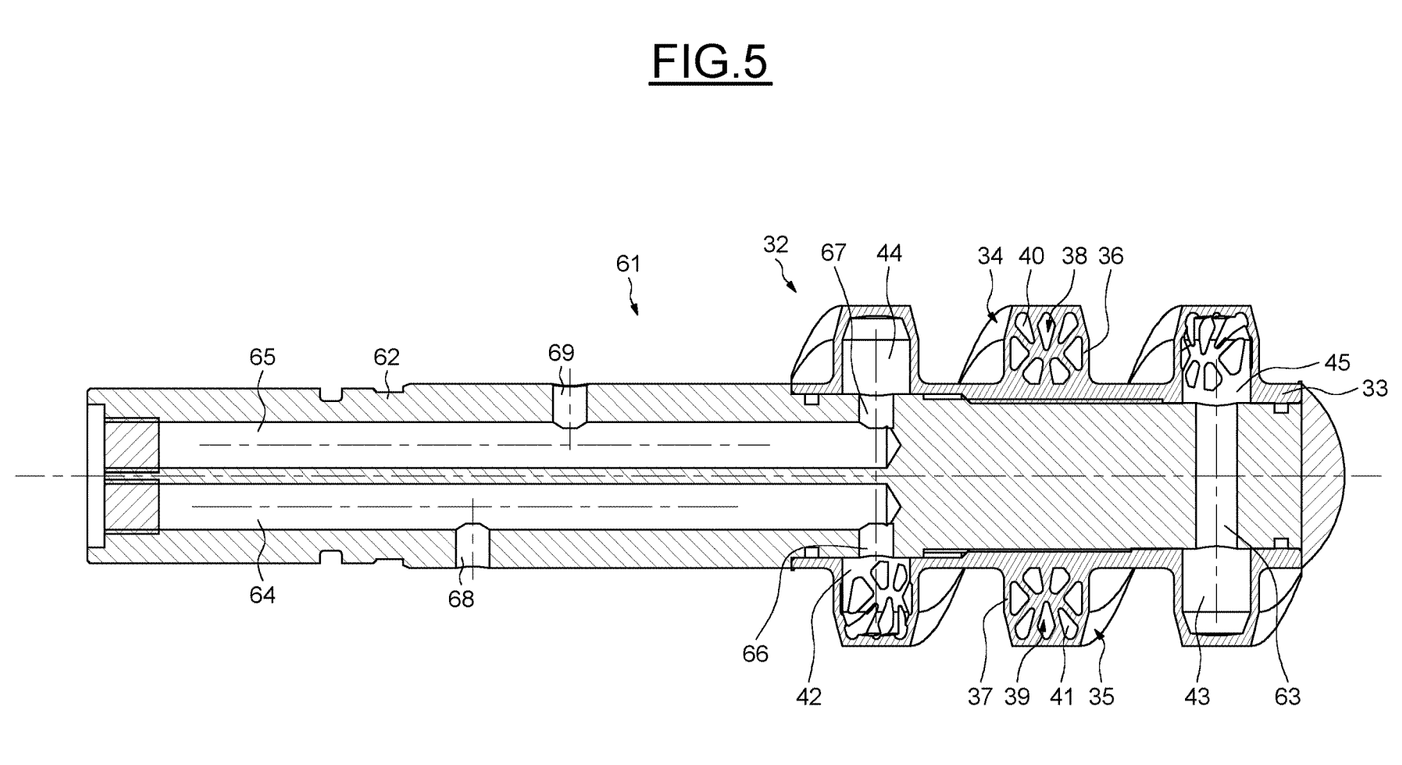
FIG. 5 depicts another assembly including the screw of FIG. 1.

FIG. 5 illustrates an assembly 61 that allows the plurality of canals 40 of the flight 34 and the plurality of canals 41 of the flight 35 of the screw 32 to be mounted in series in helices as outbound and return.

The assembly 61 includes a longitudinal mounting shaft 62 that bears the screw 32.

The mounting shaft 62 is provided with an intermediate radial orifice 63 that places the manifold-like cavity 43 of the flight 34 in communication with the manifold-like cavity 45 of the flight 35, at diametrically opposed points.

The mounting shaft 62 is provided with two local longitudinal canals 64 and 65 that communicate respectively with the manifold-like cavity 42 of the flight 34 and with the manifold-like cavity 44 of the flight 35, via radial orifices 66 and 67 of this shaft 62, at diametrically opposed points.

The mounting shaft 62 is provided with two external-communication radial orifices 68 and 69 that open into the longitudinal canals 64 and 65.

By connecting the external-communication orifices 68 and 69 respectively to a fluid source and to a discharge, this fluid can be made to circulate, in series from their corresponding manifold-like cavities and as far as their corresponding manifold-like cavities, in the pluralities of interior canals 40 and 41 of the flight 34 and 35 of the screw 32, via the intermediate orifice 63.

The one-piece screws 1 and 32 that are illustrated in FIGS. 1 and 3 can be produced according to a method of powder-based additive manufacturing involving a plurality of successive steps of depositing layers of powder and of agglomerating these layers of powder in predetermined patterns using a beam of energy involving electromagnetic radiation, such as a laser beam for example, and/or a beam of particles, such as an electron beam for example.

It is desirable for the shape of the aforementioned canals internal to the screw flights of the one-piece screws 1 and 32 to be adapted to the direction of manufacture so as to avoid the risk of material collapsing during the process of manufacture in successive layers.

According to an alternative form of embodiment, the method of manufacture may involve the creation of successive layers, in patterns corresponding to successive cross sections perpendicular to the axis of the screws that are to be obtained.

According to another alternative form of embodiment, the method of manufacture may involve the creation of successive layers, in patterns corresponding to successive cross sections parallel to the axis of the screws that are to be obtained, these layers being, for example, stacked perpendicular to radial directions $\underline{F}$ indicated in FIGS. 1 and 3, these radial directions F being, for example, parallel to the axes of the aforementioned internal manifold-like cavities of the screws.

Because the one-piece screws 1 and 32 generally have an axial length greater than their outside diameter, such manufacture in successive layers parallel to their axis is advantageous because the number of layers to be produced is lower in comparison with manufacture in successive layers perpendicular to their axis. This then results in a reduction in the duration and cost of manufacture.

For that, the method begins with a step of depositing a first layer of powder on a working surface of a manufacturing support plate. Next, a source of energy, for example of the laser type, emits a beam of energy in order to heat the layer of powder according to a pattern including initial local regions, aligned axially, of radial end of the flight or flights of the screws to be obtained and thus selectively melt and agglomerate the powder in these regions.

Next, the successive layers corresponding to the successive cross sections parallel to the axis of the screws to be obtained are created until the final local regions of the flight or flights of the screws, diametrically opposite the initial local regions, have been created. Furthermore, on the one hand the screw 1 and the mounting shaft 15 described with reference to FIG. 2, and on the other hand the screw 32 and the mounting shaft 49 described with reference to FIG. 4, can be produced as a single piece in order to eliminate their, for example splined, connection and to increase the ability of the whole to withstand the transmission forces. Thus, the body 2 of the screw 1 incorporates the shaft 15, and the body 33 of the screw 32 incorporates the shaft 49. In that case, the method of manufacture in successive layers parallel to the axis of the screws that are to be obtained becomes all the more advantageous.

By way of example, the screws 1 and 32 may be made of steel, from an alloy of nickel-chrome type or from an aluminium alloy.

The invention claimed is:

1. A one-piece screw made by additive manufacturing comprising:
    a longitudinal body; and
    around the longitudinal body, at least one flight extending in the form of a helix,
    wherein the flight comprises, over part of its length, interior partitioning delimiting a plurality of interior canals that extend in the form of helices following the helix shape of the flight and comprising cavities into which the ends of the plurality of interior canals open,
    wherein the interior partitioning comprises a core and a plurality of interior partitions that radiate from the core so as to delimit the plurality of interior canals positioned around the core, a first part of the plurality of interior partitions meeting an exterior wall of the flight and a second part of the plurality of interior partitions meeting the outer surface of the longitudinal body, and
    wherein the cavities extend radially and open into a longitudinal bore of the longitudinal body at longitudinally spaced locations.

2. The screw according to claim 1, wherein the plurality of interior partitions have equal thicknesses.

3. The screw according to claim 1, wherein the exterior wall and the plurality of interior partitions have equal thicknesses.

4. The screw according to claim 1, wherein the longitudinal body is provided with the longitudinal bore in which splines are provided.

5. The screw according to claim 1, wherein the longitudinal body comprises a transmission shaft provided with a cylindrical longitudinal bore.

6. The screw according to claim 1, wherein a combined cross-section of the plurality of interior canals is at least equal to fifty percent of a total cross-section of the flight.

7. A method for manufacturing a screw according to claim 1, wherein the screw is created by additive manufacturing by deposition and agglomeration of successive layers of powder that are perpendicular to an axis of the screw that is to be manufactured.

8. A method for manufacturing a screw according to claim 1, wherein the screw is created by additive manufacturing by deposition and agglomeration of successive layers of powder that are parallel to an axis of the screw that is to be manufactured.

9. An assembly comprising:
    the screw according to claim 1; and
    a mounting and transmitting shaft engaged into the longitudinal bore of the screw and secured to the screw and provided with a longitudinal bore.

10. The assembly according to claim 9, wherein a wall of the mounting and transmitting shaft has radial orifices communicating with the cavities of the screw.

\* \* \* \* \*